Patented Nov. 4, 1947

2,430,053

UNITED STATES PATENT OFFICE 2,430,053

POLYVINYL BUTYRAL-RESORCINOL-FORMALDEHYDE ADHESIVE

Albert Hershberger, Kenmore, N. Y., assignor to E. I. du Pont de Nemours & Company, Wilmington, Del., a corporation of Delaware No Drawing. Application September 22, 1942, Serial No. 459,304

1 Claim. (Cl. 260—30)

This invention relates to the adhesion of metals and metal alloys to copolymers derived from butadiene. More particularly, this invention relates to bonding metals, and especially light metals, such as aluminum, magnesium and alloys containing these metals to rubber-like vulcanizable copolymers of butadiene, such as the copolymers of acrylonitrile and butadiene, of styrene and butadiene, and of isobutylene and butadiene.

The rubber-like vulcanizable copolymers of butadiene, such as the copolymers of acrylonitrile with butadiene, are superior to natural rubber in several ways, notably in their greater resistance to deterioration by oils and organic solvents, in their greater resistance to oxidation on aging, and in their lower permeability to gases, all of which make for improved stability. By reason of these superior properties the substitution of butadiene copolymers for natural rubber in many of the commercial applications of the latter would seem to be indicated. Of major importance among these applications, especially in the automotive and airplane industries, is the attachment of rubber to metals in the fabrication of engine mountings, fittings, seals, floor and running boards, sound and vibration insulating members, and a host of other structures. However, a satisfactory bond between metals and copolymers of butadiene has not heretofore been obtainable and for this reason the obviously advantageous substitution of such copolymers for natural rubber has not been successfully achieved.

It is, therefore, an object of this invention, to provide adhesive compositions that will tenaciously bond metals to butadiene copolymers. Another object of this invention is to provide as new structures metals joined to a butadiene copolymer by means of these improved adhesive compositions. A further object is to provide an improved method of joining metals and especially light metals and light metal alloys to rubber-like vulcanizable butadiene copolymers. A still further object of this invention is to bond aluminum, magnesium, and aluminum-magnesium alloys to acrylonitrile butadiene copolymers or to compounded stock containing the same. These and other objects will more clearly appear from the description that follows.

The above objects are realized by this invention which consists in bonding a metal to a butadiene copolymer by means of an adhesive composition comprised essentially of a polyvinyl butyral and an insoluble, infusible polyhydric phenol-aldehyde resin. This is accomplished by first applying to the base of metal a composition comprising a polyvinyl butyral and thermo-setting, resin-forming ingredients comprising a polyhydric phenol, an aldehyde and a polymerization catalyst, all dissolved in a suitable solvent, causing the thermo-setting, resin-forming ingredients to react to form a substantially insoluble, infusible resin, and then applying the butadiene copolymer thereover and pressing together the structure thus formed at an elevated temperature.

The polyvinyl butyral must be one in which at least 30%, but no more than 90%, of the hydroxyl groups of polyvinyl alcohol are substituted by reacting the polyvinyl alcohol with butyraldehyde. This corresponds to the range of from 20.7% to 47.4% of combined butyraldehyde. The polyvinyl butyrals in which the degree of hydroxyl substitution is in the range of from 50% to 85% (31.3% to 45.7% combined butyraldehyde) are preferred.

The polyvinyl butyrals produced by butyralization of polyvinyl alcohol substantially free of any ester groups are preferred. However, polyvinyl butyrals containing a minor proportion of ester groups may be used with good results.

As the thermo-setting, resin-forming ingredients of the adhesive, polyhydric phenols and aldehydes which are soluble to the extent of 1% to 10% or more in the organic solvent employed, are preferred. The resin formed by the interaction of the resin-forming ingredients should be capable of polymerizing rapidly and completely to a substantially insoluble, infusible stage at temperatures of about 125° C. or less. The polyhydric phenols having the hydroxyl groups in the benzene nucleus meta with respect to one another, such as resorcinol, phloroglucinol and orcinol, are preferred. Also suitable are the naturally occurring polyhydric phenols, e. g. the tannins extracted from the bark of the quebracho tree, known as quebracho extract. As the aldehyde member of the resin-forming ingredients, formaldehyde, para-formaldehyde, acetaldehyde, furfural and aldol are all especially satisfactory. Preferably, the aldehyde is used in some excess of that theoretically required to react with all the phenol present in order to insure polymerization of all the phenol.

A basic catalyst, to promote polymerization of the resin-forming ingredients, such as NaOH, KOH, etc. in concentrations of 0.5% to 1.5% by weight, on the basis of the resin-forming materials, is preferred.

The ratio of the partial polyvinyl butyral to the polyhydric phenol-formaldehyde resin-forming ingredients is important. Best results are obtained when the partial polyvinyl butyral is used in concentrations between 30% and 45% of the total weight of the solvent-free adhesive layer, although the concentration of the polyvinyl butyral resin may be varied within the range of from 25% to 60% of the total weight of the solvent-free adhesive layer.

The composition consisting of a polyvinyl butyral and the resin-forming ingredients dissolved in a suitable organic solvent may be applied to the metal or metal alloy by spraying, by brushing, by doctoring, or by any other suitable means and the solvent evaporated at room temperature or at an elevated temperature. At some stage in the drying process or subsequent to drying, it is preferred that the temperature be raised to a point above 65° C., but not in excess of about 125° C., for a short time to insure polymerization of the resin-forming material to a substantially insoluble, infusible form.

The rubber-like vulcanizable butadiene copolymers, such as the copolymer of acrylonitrile and butadiene, the copolymer of styrene and butadiene, and the copolymer of isobutylene and butadiene, may be mixed or compounded with any of the usual compounding materials, such as pigments, fillers, softeners or plasticizers, accelerators, stabilizers, dispersing agents, aging resistors, sulfur, etc. It is essential, however, that the butadiene copolymer be uncured at the time it is joined to the adhesive layer and cured in place.

The pressure, temperature and time under which the laminated structure of metal, adhesive, and copolymer is finally set up and the butadiene copolymer cured, may of course be varied within reasonable limits. It is generally desirable to maintain the structure under reasonably high pressure, for example, at least 100 pounds per square inch, to obtain the best bond, but reasonably satisfactory results can be obtained by setting up the structure at substantially lower pressures, e. g., 5 to 10 pounds per square inch. Also, the temperature of curing will vary, depending on the specific butadiene copolymer and various compounding ingredients in the compounded stock. In general, this temperature may range from 80° C. to 160° C. The time may also be varied. At the lower temperatures, it is generally advisable to prolong the period for setting up the structure and curing the butadiene copolymer, while at the higher temperatures the time can be somewhat shorter. While the time may be varied from a few minutes to several hours, in general the time range of from 20 minutes to 80 minutes is preferred.

The following example further illustrates the invention. Parts are by weight.

*Example*

An adhesive for bonding aluminum to a compounded acrylonitrile butadiene copolymer is prepared as follows: 15 parts of polyvinyl butyral prepared by combining about 73% (about 41.5% combined butyraldehyde) of the hydroxyl groups of polyvinyl alcohol with butyraldehyde are dissolved in 85 parts of ethyl alcohol denatured with methyl alcohol. To this solution is added a solution comprised of 15 parts of resorcinol, 30 parts of formalin (37% formaldehyde in water), 3 parts of 10% solution of NaOH in water and 100 parts of ethyl alcohol denatured with methyl alcohol. After thoroughly mixing the two solutions together, the composition is applied, for instance, by brushing, to a previously cleaned aluminum sheet and the solvent evaporated at a temperature of about 50° C. When solvent-free, the aluminum sheet with the adhesive coating is put in an oven at 80° C. for 10 minutes. A sheet of compounded acrylonitrile butadiene copolymer is next applied against the resin-coated surface and the laminae pressed together under a pressure of 250 pounds per square inch and heated to a temperature of 135° C. for 40 minutes while maintaining this pressure.

It was found that the compounded acrylonitrile butadiene copolymer adhered to the aluminum tenaciously and even after immersion in water for 6 weeks could only be separated from the aluminum with extreme difficulty. Furthermore, the bond was not noticeably weakened when subjected to live steam for 4 hours. The bond was also not affected after immersion in a mixture of 60% gasoline and 40% aromatic hydrocarbon for one month.

While it is generally preferred to coat the base metal with the adhesion composition herein described, under certain conditions it may be desired to coat the butadiene copolymer or to apply the adhesive coating to both the metal and the butadiene copolymer. In any case, the coating or coatings will be dried free of solvent before the parts are joined to form the final structure and it is generally preferred to subject the adhesive coating to a sufficiently elevated temperature to cause the polyhydric phenol-aldehyde resin to reach the infusible, insoluble state before applying the other material.

The metals to which butadiene copolymers may be adhered include any metal or metal alloy, such as zinc, nickel, chromium, copper, brass, iron, steel, stainless steel, magnesium alloy, lead, etc. The light metals such as aluminum and magnesium and alloys of these last-named metals, however, form a class of base materials to which the butadiene copolymers are particularly applicable.

The laminated metal-butadiene copolymer structure made in accordance with this invention possesses certain properties that have not heretofore been obtained. Adhesion between the metal and the butadiene copolymer is tenaciously retained even upon long immersion in water or when exposed for long period of time to the action of steam. The satisfactory joining of butadiene copolymers and compounded stocks containing the same to light metals and light metal alloys, such as aluminum, is especially timely for many construction details. This invention makes it possible to laminate various butadiene copolymers to a wide variety of metals, metal alloys, and obtain a joint of satisfactory strength under all sorts of adverse conditions. Furthermore, the preparation of laminated structures is simple and no very high temperature or long period of baking is required to set up the resin in the adhesive.

Since it is obvious that various changes and modifications may be made without departing from the nature and spirit of the invention, it is to be understood that the invention is not to be limited except as set forth in the following claim.

I claim:

A composition of matter consisting of 15 parts by weight of polyvinyl butyral containing about 41.5% combined butyraldehyde, 15 parts by weight of resorcinol, 30 parts by weight of a 37% aqueous solution of formaldehyde, 3 parts by weight of a 10% aqueous solution of sodium hydroxide, and 185 parts by weight of ethyl alcohol denatured with methyl alcohol.

ALBERT HERSHBERGER.

REFERENCES CITED

The following references are of record in the file of this patent:

UNITED STATES PATENTS

| Number | Name | Date |
|---|---|---|
| 2,310,889 | Becker | Feb. 9, 1943 |
| 2,227,991 | Winkelmann | Jan. 7, 1941 |
| 2,234,621 | Brous | Mar. 11, 1941 |
| 2,307,588 | Jackson et al. | Jan. 5, 1943 |
| Re. 20,430 | Morrison et al. | June 29, 1937 |
| 2,128,635 | Charch et al. | Aug. 30, 1928 |
| 2,343,551 | Harkins | Mar. 7, 1944 |
| 2,302,557 | Langkammerer | Nov. 17, 1942 |

OTHER REFERENCES

Ser. No. 301,165, Putzer-Reybegg (A. P. C.), published April 20, 1943.